E. F. GINGRAS.
BOTTLE HANGER.
APPLICATION FILED OCT. 24, 1913.

1,090,392.

Patented Mar. 17, 1914.

WITNESSES:

INVENTOR
Edward F. Gingras
by his attorney
J. Edward Thebaud.

UNITED STATES PATENT OFFICE.

EDWARD F. GINGRAS, OF BUFFALO, NEW YORK.

BOTTLE-HANGER.

1,090,392.      Specification of Letters Patent.      Patented Mar. 17, 1914.

Application filed October 24, 1913. Serial No. 797,118.

*To all whom it may concern:*

Be it known that I, EDWARD F. GINGRAS, a citizen of the United States, residing in Buffalo, in the county of Erie and State of New York, have invented new and useful Improvements in Bottle-Hangers; and I do declare the following to be a full, clear, and exact description of my invention, such as will enable others skilled in the art to which it appertains to make and use the same, reference being had to the accompanying drawings, and to figures of reference marked thereon, which form part of this specification.

Like figures refer to like parts.

My invention relates to bottle hangers, particularly to means for supporting milk bottles above the floor or ground.

The object of my invention is to provide simple and serviceable means for supporting milk bottles on a wall out of reach of pet animals.

A further object is to cover the top of such supported milk bottles and provide a holder for bills or other papers upon said means.

My invention is illustrated in the figures. The construction of two forms of the same is there shown and described in detail in this specification and what I claim is set forth.

Figure 1:
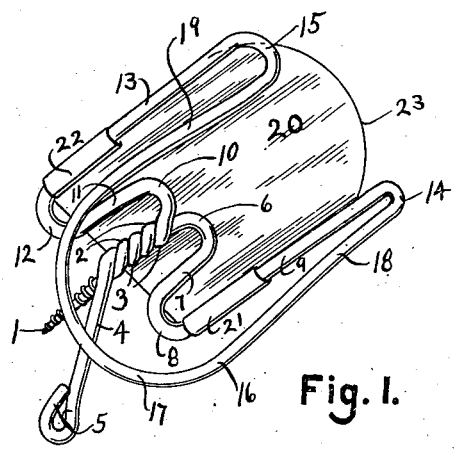
Figure 2:
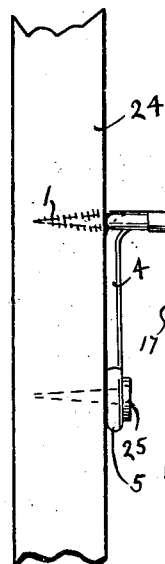
Figure 3:
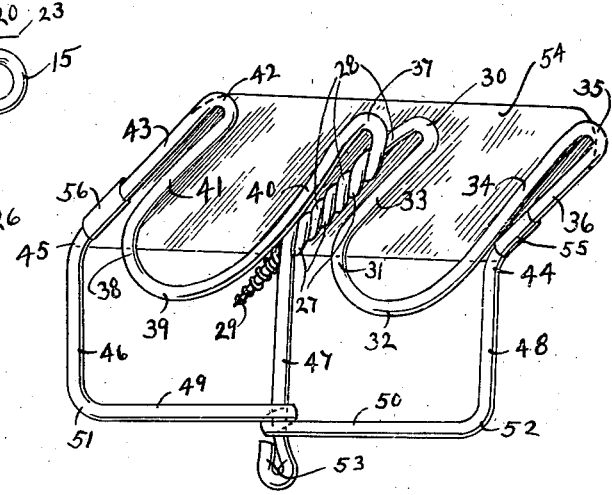

Figure 1 is a perspective view of the single form of my device. Fig. 2 is a side elevation of the form shown in Fig. 1, but in this figure the said device is shown attached to a wall and supporting a part of a milk bottle. Fig. 3 is a double form of my device shown in perspective.

In Fig. 1, an elastic wire is shown bent to form the said invention and over the wire form is a plate. The wire form is continuous. Starting with the screw end 1, the succeeding portion 2 is shown twisted with a portion 3, which is next to a portion 4, bent to right angles to the twisted part and terminating in a loop 5. Following along from the screw end 1, through and beyond the twisted portion of 2 is the bend 6, the straight portion 7, the bend 8, and the straight side portion 9. Following along the portion 4, through and beyond the twisted portion of 3 is the bend 10, the straight portion 11, the bend 12 and the straight side portion 13. The bends 6, 8, 10 and 12 and the portions 2, 3, 7, 9, 11 and 13 are all approximately in the same plane, while the portion 4 stands down about at right angles to this plane. Extending downward from the portions 9 and 13 are the respective bends 14 and 15, the planes of which bends, 14 and 15, converge below said first mentioned plane. Continuous with the bends 14 and 15 is the horseshoe shaped loop 16, adapted to conform to the shape of the neck of a milk bottle. The transverse diameter of the curved portion 17, of said loop 16, is greater than that between the longitudinal portions 18 and 19, where they meet the respective bends 14 and 15. A plate 20, of sheet metal, is mounted upon the portions 9 and 13 by the respective clips 21 and 22. The front portion 23 of said plate 20 is curved and free from any attachment with the wire.

In Fig. 2, 24 represents a wall into which is embedded the screw portion 1 of said device. A nail 25 passes through the loop 5 into the wall 24 to assist in anchoring the device to the said wall. 26 is the upper portion of a milk bottle positioned and supported within the inclined loop 16.

In Fig. 3, two loops for bottles are shown. The wire used to make this double form is of one continuous piece. The two portions of wire 27 and 28 are twisted together. The portion 27 terminates in a screw 29. Continuous with the portion 27 is the bend 30, which extends downward into a large loop 31, having a curved portion 32 and longitudinal portions 33 and 34. A bend 35 is continuous with the portion 34 and extends into a side portion 36. Continuous with the portion 28 is the bend 37, which extends downward into a large loop 38 having a curved portion 39 and longitudinal portions 40 and 41. A bend 42 is continuous with the portion 41 and extends into a side portion 43. The portions 27, 28, 36 and 43 are approximately in the same plane. The loops 31 and 38 are approximately in another plane, which dips down from the plane just mentioned, similar to the plane of the loop shown in the other two figures. The remaining portions of the wire, which form this double device, include the bends 44 and 45, the planes of which are at right angles to the plane of 43 and 36; the parallel portions 46, 47 and 48; the portions 49 and 50, which encircle the portion 47 at their junction; the bends 51 and 52 are all approximately in the same plane, which plane is about at right angles with the plane of the side portions 36 and 43. The portion 47 terminates in a loop 53. A cover plate 54 is fastened to the side portions 36 and 43 by the respective clips 55 and 56.

To use the hanger, the threaded portion is screwed into an upright support 24, far enough to position the portion 4 of said hanger against the said support 24. A nail or screw is next driven through the small loop 5, having the cover plate 20 in a horizontal position. Having thus mounted the hanger, it is ready to receive a milk bottle. When inserting the top of a milk bottle between the free bent ends 14 and 15, these ends will yield elastically allowing the bottle to be forced in against the curved portion 17, of the horseshoe shaped loop 16. The larger part of said bottle, will then rest above the said loop 16 and the bottle will then be supported by virtue of the closure action of the elastic loop 16. Inasmuch as it is necessary to have the ends 14 and 15 free for the insertion of the bottle in the manner just described, the cover plate 20 is attached to the side portions 9 and 13 at points away from the said free ends 14 and 15. As an additional precaution to hold the bottle secure in the hanger, the loop 16 is formed tilting downward. The relative positions of the bends 6, 8, 10 and 12 and the portions 7, 9 and 11 and 13 give rigidity to the hanger and form a body in conjunction with the threaded portion 1 and the portion 4, for the action of the free ends 14 and 15 with the loop 16 in supporting the bottle. Inasmuch as the end 23 of the plate 20 is free, opportunity is afforded for inserting sheets of paper as bills, etc., between said plate 20 and the side portions 9 and 13. The plate 20 protects the top of the bottle supported.

In the form of my device shown in Fig. 3, although capacity for supporting two bottles is illustrated, the features pertaining to the loops 31 and 38 and the free ends of same are similar in form and function to those described for the single form of bottle holder. I, therefore, do not confine myself to the single form of hanger. It is possible to form wire into a hanger having any number of supporting loops, having free elastic ends to preform in multiple, the supporting functions of the single form of hanger embodying my invention.

Having described my invention, I claim:—

1. In a bottle hanger, a body, a threaded portion of said hanger projecting from said body, elastic side portions extending from said body, and a horseshoe shaped loop having longitudinal elements connected with the free ends of said side portions and inclined in a position to said body, said loop being formed to receive and support by an elastic grip, a bottle near its neck.

2. In a bottle hanger, a body, a threaded portion of said hanger projecting from said body, elastic side portions extending from said body, a horseshoe shaped loop having longitudinal elements connected with the free ends of said side portions and inclined in a position to said body, said loop being formed to receive and support by an elastic grip, a bottle near its neck, and a cover attached to said body.

3. In a bottle hanger, a body, a threaded portion of said hanger projecting from said body, a plurality of pairs of elastic portions extending from said body, and a horseshoe shaped loop having longitudinal elements connected with the free ends of each pair of said side portions and inclined in position to said body, each of said loops being formed to receive and support by an elastic grip, a bottle near its neck.

4. In a bottle hanger, a body, a threaded portion of said hanger projecting from said body, a plurality of pairs of elastic portions extending from said body, a horseshoe shaped loop having longitudinal elements connected with the free ends of each pair of said loops being formed to receive and support by an elastic grip, a bottle near its neck and a cover attached to said body.

5. In a bottle hanger, a body, formed from wire, a threaded portion of said wire projecting from said body, elastic elements having free ends formed from said wire and continuous with said body, and a loop having longitudinal sides continuous with the free ends of said elements, said loop being formed by a continuation of said wire and depending below said body.

6. In a bottle hanger, a body formed from wire, threaded portion of said wire projecting from said body, elastic elements having free ends formed from said wire and continuous with said body, a loop having longitudinal sides continuous with the free ends of said elements, said loop being formed by a continuation of said wire and depending below said body and a cover plate attached to said body.

EDWARD F. GINGRAS.

Witnesses:
J. EDW. THEBAUD,
E. LOVESE LADD.